June 19, 1956  E. WILDHABER  2,750,850
METHOD OF CUTTING GEARS
Original Filed Oct. 30, 1951  4 Sheets-Sheet 1

INVENTOR.
ERNEST WILDHABER
BY Richard W. Treverton
ATTORNEY

June 19, 1956  E. WILDHABER  2,750,850
METHOD OF CUTTING GEARS
Original Filed Oct. 30, 1951  4 Sheets-Sheet 2

*INVENTOR.*
ERNEST WILDHABER
BY
*Richard W. Treverton*
ATTORNEY

June 19, 1956    E. WILDHABER    2,750,850
METHOD OF CUTTING GEARS
Original Filed Oct. 30, 1951    4 Sheets-Sheet 3
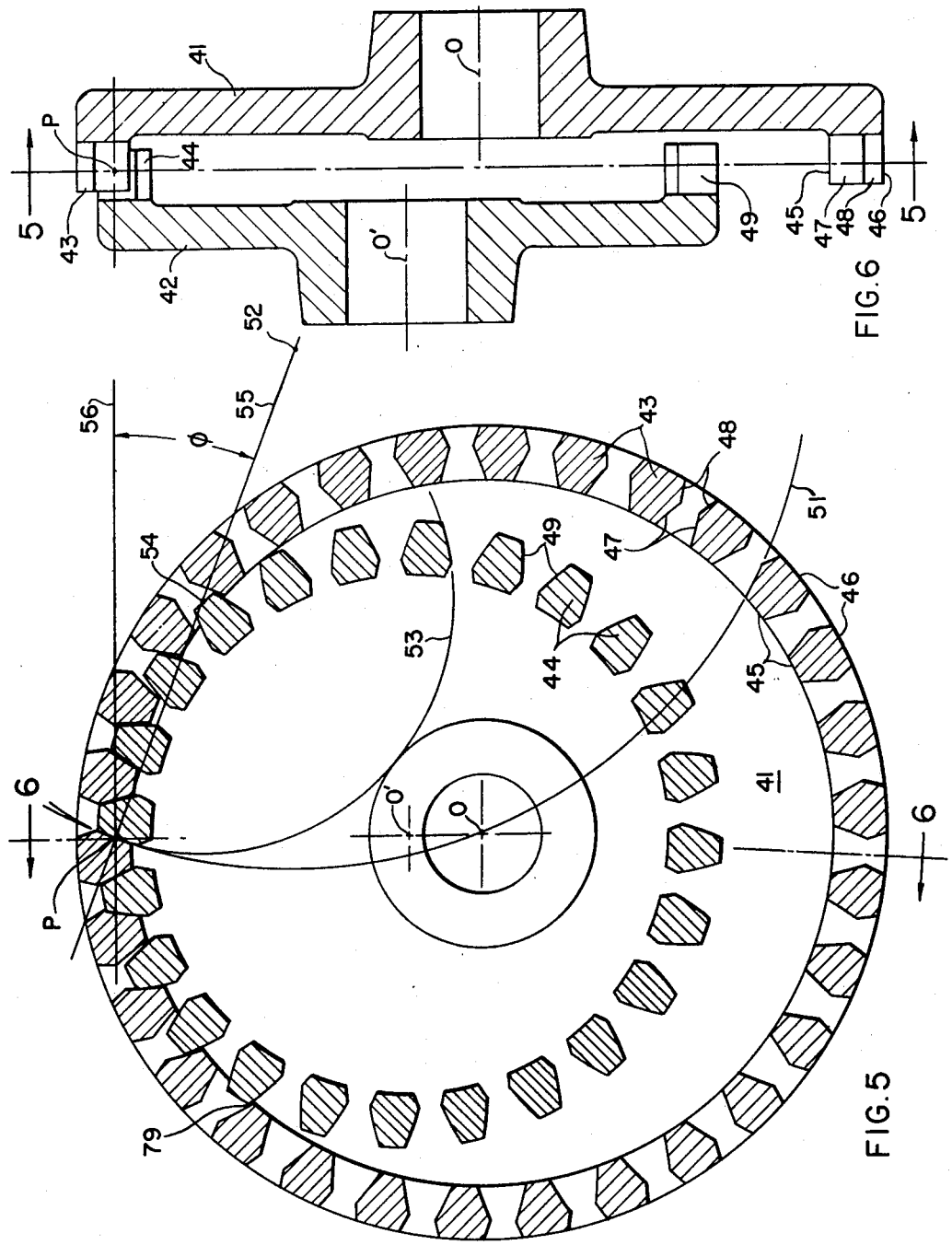
INVENTOR.
ERNEST WILDHABER
BY Richard W. Treverton
ATTORNEY

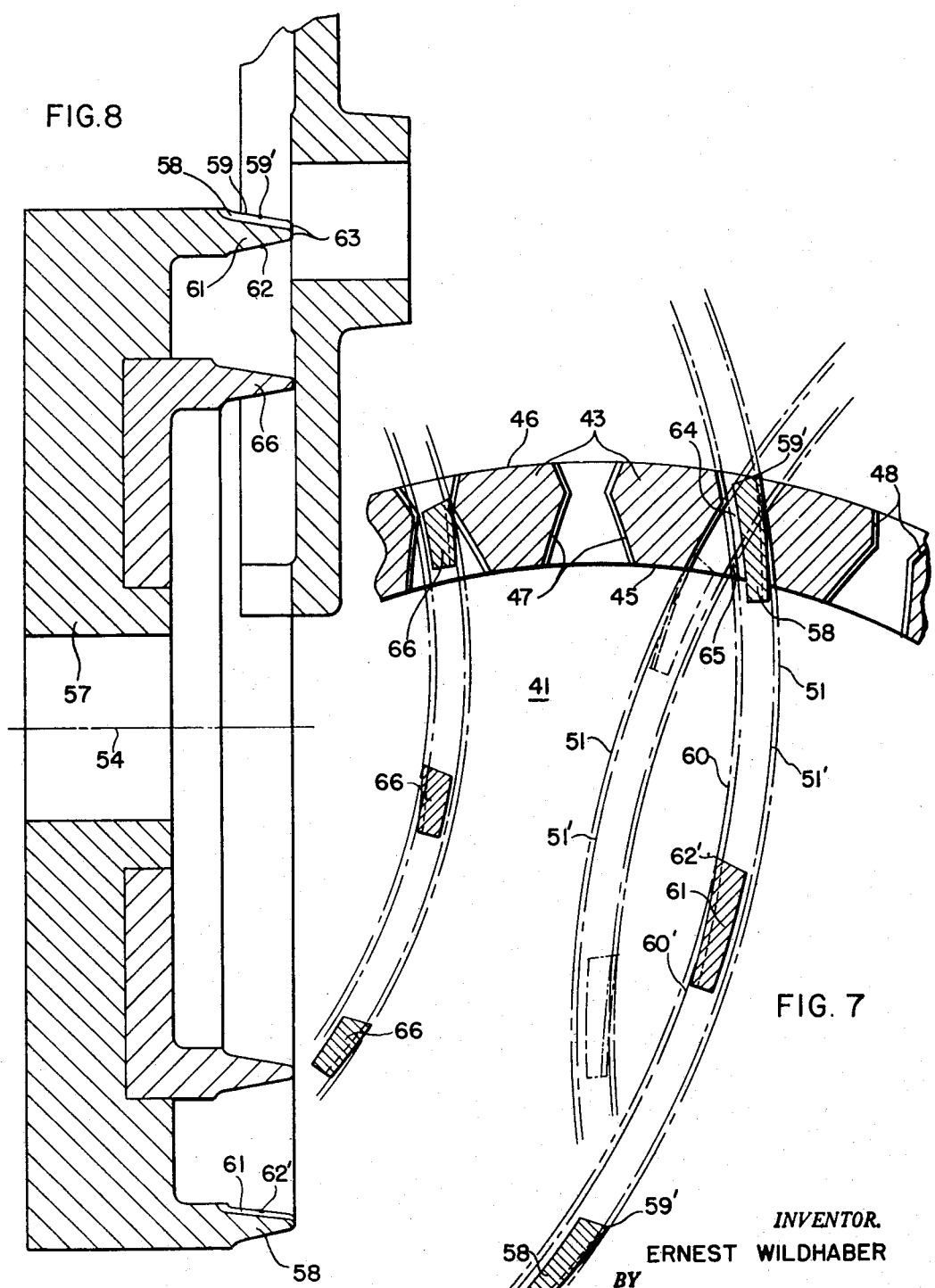

United States Patent Office 2,750,850
Patented June 19, 1956

2,750,850

METHOD OF CUTTING GEARS

Ernest Wildhaber, Brighton, N. Y., assignor to The Gleason Works, Rochester, N. Y., a corporation of New York Original application October 30, 1951, Serial No. 253,781. Divided and this application October 7, 1952, Serial No. 313,383

16 Claims. (Cl. 90—9.4)

The present invention relates to a method of cutting the teeth of gears of the kind disclosed in my co-pending application Serial No. 253,781, filed October 30, 1951, of which the present application is a division.

The teeth extend in an axial direction from a side face of each gear so that the tooth spaces are open on the face and also at both radial ends. In other words the teeth extend from the web or body portion of the gear, and in the case of an internal mesh gear the usual rim at the bottom of the teeth is omitted. The working profiles of the teeth are of the circular arc shape disclosed in my Patent No. 2,230,418 granted February 4, 1941. Such profiles when properly proportioned and positioned transmit motion at constant velocity ratio and when used as internal mesh gears at low ratios have somewhat less tendency to interference than the commonly used involute profiles. According to the present invention the teeth are produced by a rotary cutter, preferably one that is of annular form, and is either an edged cutting tool or an abrasive grinding wheel. The working faces of the teeth are produced by a side cutting profile of the cutter, this profile being preferably, but not necessarily, straight and inclined relative to the cutter axis.

In the cutting operation the axis of the gear being cut and the cutter axis are so arranged, parallel to each other, that the cutter simultaneously acts in two different tooth spaces of the gear, thereby cutting the opposite working faces of spaced teeth. The cutting operation is repeated for each tooth space of the gear, and between such operations the cutter is withdrawn and the gear indexed to bring successive tooth spaces into alignment with the cutter.

The working tooth faces preferably are conical surfaces, so that the teeth taper in an axial direction, being thickest at the web or body portion of the gear. The teeth may be strengthened further by making them substantially longer (their dimension radially of gear) than their working faces. The teeth are advantageously made of hexagonal shape in transverse section, each side of the tooth consisting of the working face and an adjacent, angularly related face. This face may be cut with the same annular tool that cuts the working faces, and in the same cutting operation, but by a side cutting profile of the tool that is opposite to the side cutting profile which produces the working face. While one working face is being cut, the angularly related face of an adjacent tooth is cut.

The invention is especially advantageous as applied to internal mesh gears because their tooth profile curvature is small, so that relatively large diameter cutters are used in making them. I have discovered that internal gear tooth interference, that may be encountered when the gear ratio is low (depending upon the pressure angle and tooth length but usually at ratios of less than 2:1), is alleviated by changing the tooth proportions to make the gear addendum longer than the pinion addendum. I have also discovered that less tendency toward internal interference is encountered with circular arc tooth profiles than with involute profiles, and, hence, that for equal tooth length and pressure angle the internal gears produced by the present invention enable ratios closer to unity than is possible with conventional involute gears.

The foregoing and other objects and advantages of the invention will appear from the following description made with reference to the drawings, wherein:

Fig. 5 is a transverse section, taken along line 5—5 of Fig. 6, of an internal mesh gear and mating pinion;

Fig. 6 is an axial section taken along line 6—6 of Fig. 5;

Fig. 7 is a fragmentary transverse section on an enlarged scale through one member of the gear pair shown in Fig. 5, and the cutter used for producing it;

Fig. 8 is an axial section through the gear and cutter shown in Fig. 7; and,

Figures 1, 2:
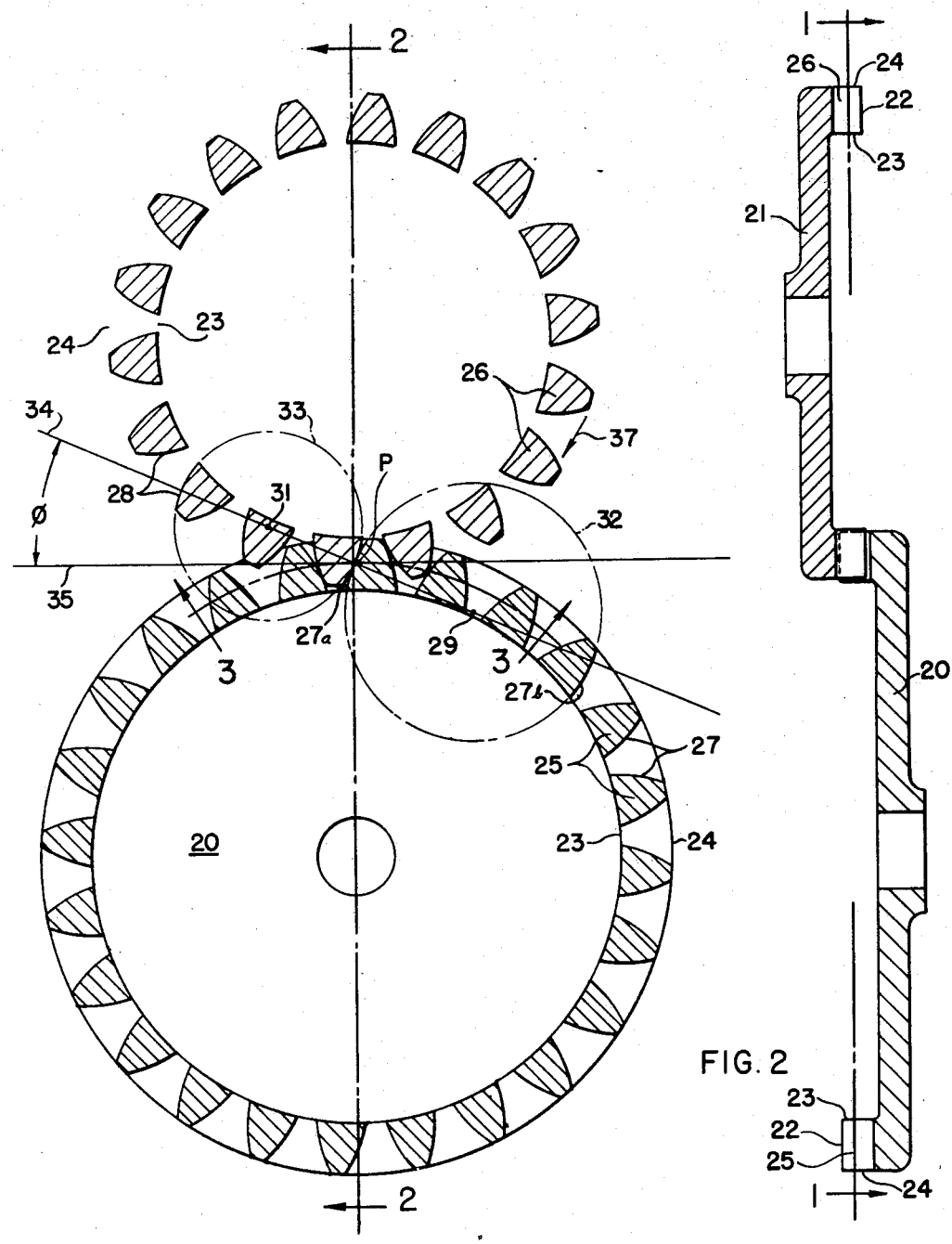
Fig. 1 is a transverse section, taken along line 1—1 of Fig. 2, through a mating pair of external gears.
Fig. 2 is an axial section taken along line 2—2 of Fig. 1.

As shown in Figs. 1 and 2 the gear 20 and pinion 21 each has its teeth extending axially from the face of its web or body portion, so that the tooth spaces are open at the face 22 and also at their inner and outer radial ends, designated 23 and 24 respectively. The gear teeth 25 and pinion teeth 26 have working profiles, designated respectively 27 and 28, that are convex circular arcs, being produced by the inner side cutting profiles of cutters rotating respectively about centers 29 and 31, and following the circular cutting paths designated 32 and 33. The cutter for the gear while rotating in its path 32 simultaneously produces the opposite working faces of two spaced teeth, these being the left face 27a of one tooth and the right face 27b of a spaced tooth. The same is true of the cutter for the pinion. The axes of rotation of the cutters are parallel to the axes of the gears they cut, and, as shown, lie in a plane 34 that is disposed at the desired pressure angle $\phi$ to the pitch plane 35 and that intersects the latter along a line which contains the mean pitch point P. The correct cutter radii (the radii of circular paths 32 and 33) may be determined, as disclosed in my Patent No. 2,230,418, by the formulae:

$$C_G = \frac{3r \sin \phi}{2\frac{r}{R}+1}$$

and $$C_P = \frac{3r \sin \phi}{2+\frac{r}{R}}$$

where $C_G$ and $C_P$ are the radii of the cutters for the gear and pinion respectively, R and r the pitch radii of the gear and pinion, and $\phi$ is the pressure angle.

The radii of the cutters may be modified within reasonable limits in order that the cutters may be symmetrical with respect to the two teeth they cut simultaneously, while maintaining the cutter axes in the plane 34. Thus the radius of circular path 32 may be increased or decreased slightly, so that the path may follow both profiles 27a and 27b. This will not affect appreciably the uniform velocity ratio characteristics of the gear pair, provided that the radius of path 33 (of the pinion cutter)

is correspondingly decreased or increased so that the relative curvature of the mating profiles $$\frac{1}{C_G}+\frac{1}{C_P}$$

is kept the same or is increased only slightly. Of course the number of teeth and the pressure angle $\phi$ may also be varied as desired in order to facilitate selection of appropriate cutter radii.

Figure 3:
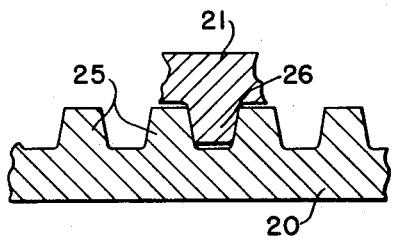
Fig. 3 is a plane development of a cylindrical section taken along line 3—3 of Fig. 1 when the gears are rotated by one-quarter pitch from the position shown in Fig. 1.
Figure 4:
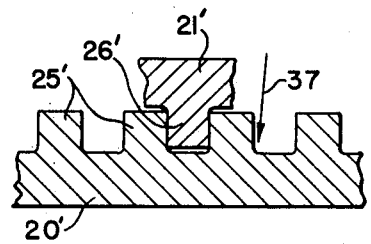
Fig. 4 is a view like Fig. 3 but illustrating an alternative form of tooth.

In Fig. 3 the teeth will be seen to taper in an axial direction, being thickest at their junctures with the gear body. Such tapering is effected inclining the side cutting profile of the cutter to the cutter axis. Accordingly the working faces of the gears are circular conical surfaces with axes 29 and 31. Cutting is effected by feeding the rotating cutter in an axial direction with respect to the work. While the tapered tooth form of Fig. 3 is preferred because of its greater strength, other forms are possible. For example in Fig. 4 the working faces of the teeth 25' and 26' are parallel to the gear axes and hence are cylindrical surfaces. They are produced by cutters whose side cutting profiles are likewise parallel to the gear axes. Such a cutter may be fed into the work (in this instance gear 26') at a slight angle to the direction of its axis, such as in the direction of arrow 37 in Fig. 4. However with the feed at such an angle it may be necessary in some instances to cut the opposite sides of the teeth in separate operations.

In the pair of gears shown in Figs. 5 and 6 the internal mesh gear 41 has its axis at O, while the axis of the mating pinion 42 is at O'. The gear teeth 43 and also the pinion teeth 44 extend axially from their respective gear bodies. They are strengthened by being made substantially longer (their radial dimension) than their working faces, and are hexagonal in transverse cross-section, having, in addition to their two working faces and their inner and outer faces (which will usually be surfaces of revolution about the respective gear axes), two other faces each of which is disposed at an obtuse angle to the adjacent working face. The inner and outer faces of the gear teeth are designated 45 and 46, the working faces 47, and the other side faces 48. The working faces of the pinion are convex while those of the gear will usually be convex for gear-to-pinion tooth number ratios larger than 2 and concave for such ratios smaller than 2. Therefore in Fig. 5, where the tooth number ratio is 30/24 or 1.25, the working faces 47 of the gear are concave in profile.

The concave faces 47 are produced by the outside side cutting profile of a cutter rotated along path 51 about axis 52; while, as in the case of both gear members shown in Figs. 1 and 2, the convex faces 49 of pinion 42 are cut with the inside side cutting profile of a rotary cutter. This cutter rotates along path 53 about axis 54. As in the first-described embodiment the axes 52 and 54 are parallel to the axes of the gears and lie in a plane 55 which contains the mean pitch point P. This point is along the line of intersection of plane 55 with the pitch plane, 56, the two planes intersecting at the pressure angle $\phi$.

The gear tooth faces 48 (and the corresponding faces of the pinion 42) may be produced simultaneously with the cutting of the working faces and with the same rotating cutter, this being illustrated in Figs. 7 and 8. Here the cutter 57 is one shaped to produce tapered teeth such as are shown in Fig. 3. The cutter has axially extending outside cutting blades 58 with side cutting edges 59 containing points 59' which trace the circular path 51 shown in Fig. 7. The tip points of the side cutting edges 59 trace the circular path 51'. The cutter also has inside cutting blades 61 with cutting edges 62 containing points 62' which trace the circular path 60, these edges 62 producing the conical surfaces 48. The tip points of the side cutting edges 62 trace circular path 60'.

It will be understood that the cutter operates in each tooth space twice during the cutting of a gear, once for producing the working face at each side of the space.

There is an overlap of the two sweeps of the tip cutting edges 63 of blades 58 and 61, as is shown by the diamond shaped area 64 formed by the two circular paths 51' and the two circular paths 60'. However, the widths of the blades must be so limited as to enable the blades to pass through the tooth spaces at their narrowest points, and hence this overlap may be insufficient in some instances to remove a fin 65. To cut away this fin auxiliary cutting blades 66 are provided on the cutter 57, these blades being arranged in a circle concentric with the cutter axis 54 to act in tooth spaces other than those in which blades 58 and 61 are cutting. To the extent that the auxiliary blades remove stock in advance of blades 58 and 61, they constitute roughing blades which reduce the cutting load borne by blades 58 and 61. In effect the blades 66 and their support constitutes a separate cutter from that which contains blades 58 and 61, and it is not essential that the cutters be used simultaneously or that they rotate at the same speed. However, as a practical matter the two cutters preferably are made to rotate as a single unit, at least for roughing or finishing from the solid.

The radii of the cutters for producing the gears 41 and 42 may be determined from formulae derived by a procedure that is essentially the same as that described in detail in my aforementioned Patent No. 2,230,418. The formulae are:

$$C_G = \frac{3R \sin \phi}{2 - \frac{R}{r}}$$

and $$C_P = \frac{3r \sin \phi}{2 - \frac{r}{R}}$$

where $C_G$ is the mean effective radius of the cutter for the internal mesh gear teeth and $C_P$ the corresponding radius for the pinion cutter; $R$ and $r$ the respective pitch radii of the internal gear and the pinion; and $\phi$ the pressure angle. It will be seen that the value of $C_G$ is negative, indicating that the working faces of the teeth are produced by an inside cutting profile, whenever the gear-to-pinion tooth number ratio is greater than 2.

As in the case of external gear pairs the cutter radii may be varied to enable each cutter to be symmetrically disposed relative to both of the teeth which it cuts simultaneously. However greater latitude in this respect is permissible in the case of internal gear pairs, without noticeably affecting the ability of the gears to transmit motion at uniform velocity ratio.

In Figs. 5, 6 and 7 the pitch point P is disposed at the mean point along the length of the tooth profiles: the teeth have standard proportions, with equal addendum and dedendum. However, I have discovered that for internal gears of given profile length and pressure angle, gear pairs more nearly approching 1:1 tooth number ratio can be produced without encountering internal interference by making the gear addendum longer.

Figure 9:
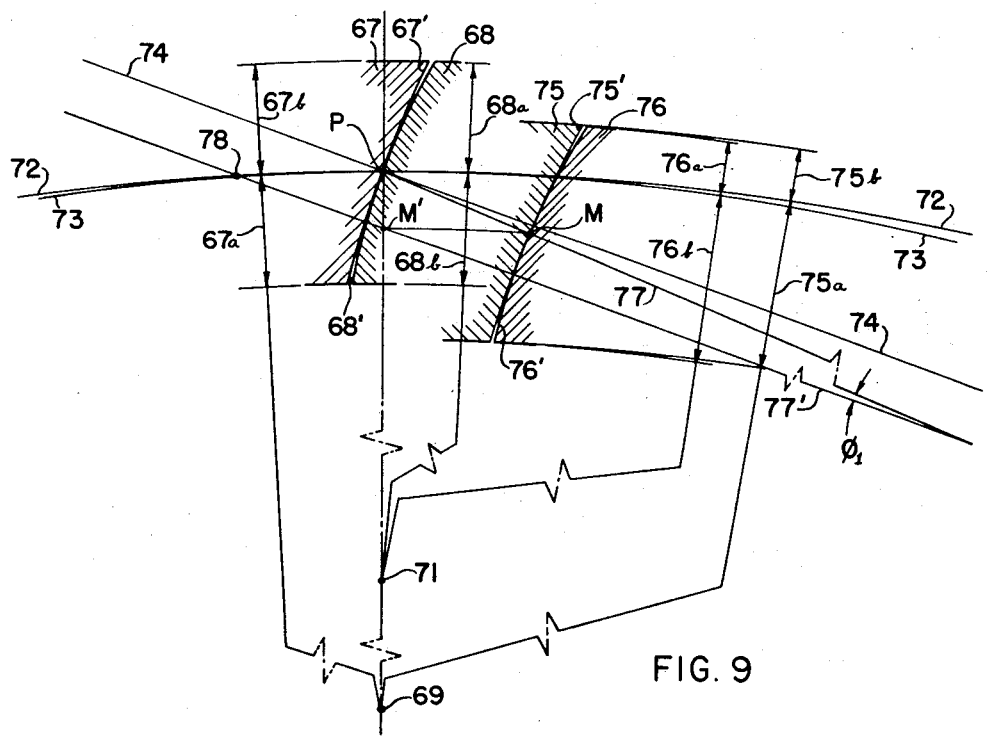
Fig. 9 is a diagram showing modified tooth proportions for preventing internal interference and other purposes.

One way in which this may be accomplished is shown in Fig. 9. Here is shown an internal mesh gear tooth 67 and a mating pinion tooth 68, these teeth being of standard proportions with their respective addenda 67a and 68a equal and also equal to their respective dedenda 67b and 68b. The addenda and dedenda measurements are made along radii from the respective centers 69 and 71 of the gear and pinion, these radii being greatly foreshortened in the drawing. The respective pitch circles 72 and 73 of the gear and pinion intersect the line of centers 69—71 at pitch point P, and through the latter also passes tooth normal 74 along which the centers of curvature of the circular arc tooth profiles 67' and 68' are disposed.

The mating gear and pinion teeth 75 and 76 in Fig. 9 have the same pitch circles 72 and 73 and the same pitch point P, but their proportions have been changed so that their respective addendum and dedendum 75a and 76b, are longer than their dedendum 75b and addendum 76a (three times as long in this particular illustration). The mean point M along these profiles is first considered as being at M', along the line of centers 69 and 71. Through M' passes the new tooth normal (i. e. the normal for the teeth with modified proportions) which in this position is parallel to the normal 74 and is designated 77', the latter intersecting the pitch circle 72 at point 78.

Then the mean point and the new tooth normal are rotated about center 69 through an angle $\phi_1$ (the same as angles 78, 69, P) they reach the position shown at M and 77. In this position M is the point of contact of profiles 75' and 76' and normal 77 intersects the pitch point P. The distances from P along line 77 of the centers of curvature of the profiles 75' and 76' may have the values $C_G$ and $C_P$, determined by the formulae given hereinbefore, taking into account that the pressure angle $\phi$ has now been increased by the angle $\phi_1$. The change of tooth proportion may be carried to any desired degree, but preferably only far enough to provide necessary clearance between the teeth that are approaching and departing from contact (at points such as that designated 79 in Fig. 5), or to provide clearance for other purposes such as that referred to hereinafter.

Instead of employing bladed cutting tools, as shown in Figs. 7 and 8, annular or cup-shaped abrasive wheels of the type well-known in the bevel gear grinding arm may be employed, such wheels having cutting or abrading surfaces that are dressed by any suitable means to substantially the shape of the surfaces of revolution described by the cutting edges of the bladed cutters hereinbefore referred to. Accordingly it will be understood that the terms "cutting" and "cutter" employed in certain of the appended claims embraces cutting with bladed cutters and also grinding with cutters in the form of abrasive wheels.

It will be understood that the methods illustrated and described herein have been disclosed by way of preferred example, to illustrate and explain the inventive principles involved, and that these principles may be otherwise utilized without departing from the spirit of my invention or the scope of the appended claims.

I claim:

1. In the cutting of a gear adapted to mesh with a mating member running on a substantially parallel axis, the gear having its teeth extending axially from the body thereof, with the inter-tooth spaces open at both radial ends thereof, and with the working faces of the teeth being surfaces of revolution whose axes are parallel to the gear axis, the method which comprises rotating an annular cutter in engagement with the work while holding the latter against rotation, with the axis of the cutter parallel to the axis of the work and so spaced therefrom that the cutter simultaneously produces the opposite working faces of spaced teeth of the work, and with the axis of the cutter in a plane that contains the mean pitch point of a tooth face being produced and that is inclined to the pitch plane, that passes through said pitch point, by the pressure angle at said point.

2. In the cutting of a gear adapted to mesh with a mating member running on a substantially parallel axis, the gear having its teeth extending axially from the body thereof, with the inter-tooth spaces open at both radial ends thereof, and with the working faces of the teeth being surfaces of revolution whose axes are parallel to the gear axis, the method which comprises rotating an annular cutter in engagement with the work while holding the latter against rotation, with the axis of the cutter parallel to the axis of the work and so spaced therefrom that the cutter simultaneously produces the opposite working faces of spaced teeth of the work, and with the axis of the cutter in a plane that contains the mean pitch point of a tooth face being produced and that is inclined to the pitch plane, that passes through said pitch point, by the pressure angle at said point effecting a feed of the cutter relative to the work in at least approximately the direction of said axes, periodically effecting a withdrawal of the cutter relative to the work and indexing the latter about its axis to bring other teeth thereof into position for cutting, and repeating said operations.

3. In the cutting of a gear adapted to mesh with a mating member running on a substantially parallel axis, the gear having its teeth extending axially from the body thereof, with the inter-tooth spaces open at both radial ends thereof, and with the working faces of the teeth being surfaces of revolution whose axes are parallel to the gear axis, the method which comprises rotating in engagement with the work an annular cutter that presents a conical cutting surface, with the cutter axis disposed parallel to the axis of the work and so spaced therefrom that said conical cutting surface simultaneously produces the opposite working faces of spaced teeth of the work, and with the axis of the cutter in a plane that contains the mean pitch point of a tooth face being produced and that is inclined to the pitch plane, that passes through said pitch point, by the pressure angle of the teeth at said point.

4. In the cutting of a gear adapted to mesh with a mating member running on a substantially parallel axis, the gear having its teeth extending axially from the body thereof, with the inter-tooth spaces open at both radial ends thereof, and with the working faces of the teeth being surfaces of revolution whose axes are parallel to the gear axis, the method which comprises rotating in engagement with the gear an annular cutter that presents a cylindrical cutting surface, with the cutter axis parallel to the axis of the gear and so spaced therefrom that said cylindrical cutting surface simultaneously produces the opposite working faces of spaced teeth of the gear, and with the axis of the cutter in a plane that contains the pitch line of a tooth face being produced and that is inclined to the pitch plane, which passes through said pitch line, by the pressure angle at said point.

5. The method of producing a pair of gears which comprises cutting each member of the pair with a rotating annular cutter having its axis disposed parallel to the axis of the member and so spaced therefrom that the cutter simultaneously produces the opposite working faces of spaced teeth of the member, with the two cutter axes in different positions in the same plane that contains the mean pitch point of the tooth faces being produced and that is inclined to the pitch plane, which contains said point, by the pressure angle at said point.

6. The method of producing a pair of external gears according to claim 5 in which $C_G$ and $C_P$ are approximately equal to, and $$\left(\frac{1}{C_G}+\frac{1}{C_P}\right)$$

is approximately equal to and not less than, the value thereof determined by the formulae:

$$C_G = \frac{3r \sin \phi}{2\frac{r}{R}+1}$$

and $$C_P = \frac{3r \sin \phi}{2-\frac{r}{R}}$$

where $C_G$ and $C_P$ are the respective distances of the axes of the cutters for the gear and pinion members from the pitch point in a mean position of contact of the teeth, R and $r$ are the respective pitch radii of said members, and $\phi$ is the pressure angle of the teeth at the mean pitch point.

7. The method of producing a pair of internal-external gears according to claim 5 in which $C_G$ and $C_P$ are approximately equal to, and $$\left(\frac{1}{C_G}+\frac{1}{C_P}\right)$$

is approximately equal to and not less than, the value thereof determined by the formulae:

$$C_G=\frac{3R\sin\phi}{2-\frac{R}{r}}$$

and $$C_P=\frac{3r\sin\phi}{2-\frac{r}{R}}$$

where $C_G$ and $C_P$ are the respective distances of the axes of the cutters for the internal and external members from the pitch point in a mean position of contact of the teeth, R and r are the respective pitch radii of said members, and $\phi$ is the pressure angle of the teeth at the mean pitch point.

8. The method of producing a pair of gears which comprises cutting each member of the pair by rotating an annular cutter in engagement with the member while holding the latter against rotation, with the axis of the cutter parallel to the axis of the member and so spaced therefrom that the cutter simultaneously produces the opposite working faces of spaced teeth of the member, and with the two cutter axes in different positions in the same plane that contains the mean pitch point of the tooth faces being produced and that is inclined to the pitch plane, which passes through said point, by the pressure angle at said point, effecting a feed of the cutter relative to the work in at least approximately the direction of said axes, periodically effecting a withdrawal of the cutter relative to the work and indexing the latter about its axis to bring other teeth thereof into position for cutting, and repeating said operations.

9. The method of cutting a circular face toothed member which comprises rotating two concentric annular cutters with their axis so disposed, parallel to the axis of the member, that one cutter simultaneously operates in spaced tooth spaces of the member to produce the opposite working faces of spaced teeth and the other cutter operates simultaneously in two other tooth spaces of the member to remove stock therefrom.

10. The method of cutting a gear having teeth extending in a direction axial of the face thereof, with the inter-tooth spaces open at both radial ends thereof, and with the teeth of generally hexagonal transverse section, comprising rotating an annular cutter, which presents inside and outside cutting surfaces, in engagement with the work while holding the latter against rotation, with the axis of the cutter parallel to the axis of the work, one of said cutting surfaces producing the working face of one tooth of the work and the other of said cutting surfaces simultaneously producing a non-working face of another tooth of the work.

11. The method of cutting a gear having teeth extending in a direction axial of the face thereof, with the inter-tooth spaces open at both radial ends thereof, and with the teeth of generally hexagonal transverse section, comprising rotating an annular cutter, which presents inside and outside cutting surfaces, in engagement with the work while holding the latter against rotation, with the axis of the cutter parallel to the axis of the work, one of said cutting surfaces producing the working face of one tooth of the work and the other of said cutting surfaces simultaneously producing a non-working face of another tooth of the work, effecting a feed of the cutter relative to the work in at least approximately the direction of said axes, periodically effecting a withdrawal of the cutter relative to the work and indexing the latter about its axis to bring other teeth thereof into position for cutting, and repeating said operations.

12. The method of cutting a gear having teeth extending in a direction axial of the face thereof, with the inter-tooth spaces open at both radial ends thereof, and with the teeth of generally hexagonal transverse section, comprising rotating an annular cutter, which presents inside and outside cutting surfaces, in engagement with the work while holding the latter against rotation, with the axis of the cutter parallel to the axis of the work and so spaced therefrom that one of said cutting surfaces simultaneously produces the opposite working faces of spaced teeth of the work and the other of said cutting surfaces simultaneously produces the opposite non-working faces of spaced teeth of the work adjacent to the first-mentioned spaced teeth.

13. The method of cutting a gear having teeth extending in a direction axial of the face thereof, with the inter-tooth spaces open at both radial ends thereof, and with the teeth of generally hexagonal transverse section, comprising rotating an annular cutter, which presents inside and outside cutting surfaces, in engagement with the work while holding the latter against rotation, with the axis of the cutter parallel to the axis of the work and so spaced therefrom that one of said cutting surfaces simultaneously produces the opposite working faces of spaced teeth of the work and the other of said cutting surfaces simultaneously produces the opposite non-working faces of spaced teeth of the work adjacent to the first-mentioned spaced teeth, effecting a feed of the cutter relative to the work in at least approximately the direction of said axes, periodically effecting a withdrawal of the cutter relative to the work and indexing the latter about its axis to bring other teeth thereof into position for cutting, and repeating said operations.

14. In the cutting of a gear adapted to mesh with a mating member running on a substantially parallel axis, the gear having its teeth extending axially from the body thereof, with the inter-tooth spaces open at both radial ends thereof, and with the working faces of the teeth being surfaces of revolution whose axes are parallel to the gear axis, the method which comprises rotating an annular cutter with its axis so disposed, parallel to the axis of the gear, that the cutter simultaneously produces opposite working faces of spaced teeth of the gear, each plane containing the pitch point of one of the working faces being produced and the axis of the cutter being inclined at an angle substantially less than a right angle to a plane radial of the gear which intersects said one of the working faces at said pitch point, said angle being 90° less the pressure angle of the teeth.

15. In the cutting of each member of a pair of gears adapted to run together on substantially parallel axes, each gear having its teeth extending axially from the body thereof, with the inter-tooth spaces open at both radial ends thereof, and with the working faces of the teeth being surfaces of revolution whose axes are parallel to the gear axis, the method which comprises rotating an annular cutter with its axis so disposed, parallel to the axis of the member, that the cutter produces opposite working faces of spaced teeth of the member, the plane which contains both the pitch point of a working face being produced and the axis of the cutter also containing, in spaced relation to the axis of the cutter, the axis of the cutter for the mating working face on the other member of the pair, and said plane being inclined at an angle substantially less than a right angle to a plane radial of the member through said pitch point, said angle being 90° less the pressure angle of the teeth.

16. The method of cutting a circular face toothed member which comprises rotating two concentric annular cutters with their common axis so disposed, in a common plane with the axis of the member, that one cutter simultaneously operates in spaced tooth spaces of the member located on opposite sides of said plane, to thereby produce the opposite faces of spaced teeth, and the other cutter operates simultaneously in two other tooth spaces of the member located on opposite sides of said plane, to remove stock therefrom.

References Cited in the file of this patent

UNITED STATES PATENTS

| | | |
|---|---|---|
| 1,498,231 | Carter | June 17, 1924 |
| 1,625,402 | Sloan | Apr. 19, 1927 |
| 2,334,366 | Wildhaber | Nov. 16, 1943 |
| 2,429,284 | Wildhaber | Oct. 21, 1947 |